Dec. 3, 1963  W. A. ASCHOFF  3,112,869
HIGH VACUUM PUMP
Filed Oct. 17, 1960
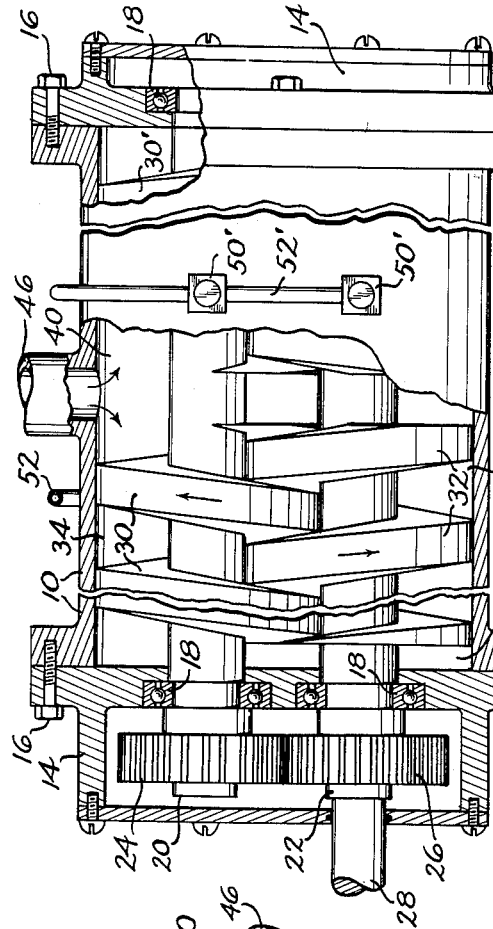
Fig. 1.
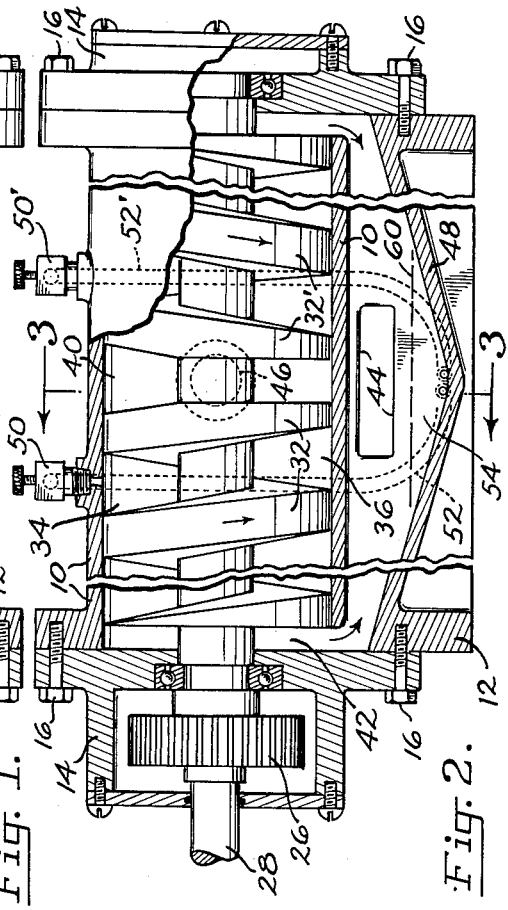
Fig. 2.
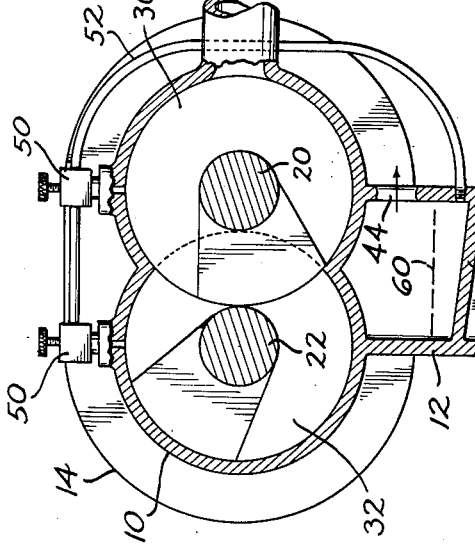
Fig. 3.
Willis A. Aschoff
INVENTOR.
BY 
Agent

United States Patent Office 3,112,869
Patented Dec. 3, 1963

3,112,869
HIGH VACUUM PUMP
Willis A. Aschoff, 3008 S. Geary St., Albany, Oreg.
Filed Oct. 17, 1960, Ser. No. 63,169
1 Claim. (Cl. 230—205)

This invention relates to pumps, and more particularly to the novel construction of a high vacuum pump.

It is a principal object of the present invention to provide a high vacuum pump which requires no external sealing against the entrance of external pressure, and in which the supporting bearings are subjected only to normal atmospheric pressure.

Another important object of this invention is the provision of a high vacuum pump in which is eliminated the possibility of contaminating the vacuum side with sealing liquid.

Still another important object of this invention is the provision of a high vacuum pump of symmetrical design and hence is operable at high speed without vibration.

Another important object of this invention is the provision of a high vacuum pump characterized by the absence of exhaust valves and hence free of noise.

A further important object of the present invention is to provide a high vacuum pump which is of simplified construction for economical manufacture, and which is capable of long and effective operation with a minimum of maintenance and repair.

The foregoing and other objects and advantages of this invention will appear from the following detailed description, taken in connection with the accompanying drawing in which:

FIG. 1 is a foreshortened plan view of a high vacuum pump embodying the features of the present invention, parts thereof being broken away to disclose details of internal construction;

FIG. 2 is a foreshortened view in side elevation as viewed from the bottom in FIG. 1, parts thereof being broken away to disclose details of internal construction; and FIG. 3 is a sectional view taken along the line 3—3 in FIG. 2.

The vacuum pump of this invention includes a main housing 10 open at its ends and provided with a hollow base 12 upon which it is supported. The opposite open ends of the housing are closed by the bearing housings 14 which are secured to the main housing by such means as the bolts 16. Extending through the main housing and supported adjacent their ends in the bearings 18, are a pair of shafts 20 and 22. These shafts are interconnected for simultaneous rotation by means of the gears 24 and 26 contained in one of the housings 14. A driving shaft 28 is connected to the shaft 22 and is adapted for connection to a source (not shown) of rotary power.

Mounted upon or formed integral with the shaft 20 within the main housing 10 are a pair of helical rotor screws 30 and 30', and it is to be noted that the direction of one screw is opposed to the direction of the other screw.

Secured to or formed integral with the other shaft 22 are a pair of helical rotor screws 32 and 32'. The direction of these screws also are opposed.

The screws 30 and 32 supported by the shafts 20 and 22 are arranged to intermesh closely along all of their surfaces, as are the screws 30' and 32'. The main housing 10 is contoured precisely to the end profile of the intermeshing screws, so as to maintain a continuous peripheral seal about those surfaces of the intermeshing screws which are not in mutual engagement. In this manner, there is provided by each intermeshing pair of screws a pair of closed chambers 34 and 36 each of which is defined by adjacent screw surfaces and the contacting surfaces of the shaft and housing wall. During rotation of the intermeshing screws the closed chambers first communicate at the inner ends of the screws with the central vacuum chamber 40, then travel outward to communicate with the passageway 42 to the atmosphere outlet 44. The central vacuum chamber 40 communicates through the conduit 46 to a chamber (not shown) which is desired to be evacuated.

It will be understood that the screws 30, 30', 32, 32' may be secured or formed integral with sleeves removably secured to the shafts 20, 22. In such event vacuum tight seals, such as O-rings, are provided between the sleeves and supporting shafts adjacent the inner ends of the sleeves to prevent passage of air from the atmosphere to the vacuum chamber through the space between the sleeves and shaft.

The atmosphere outlet 44 is located between the screw housing wall 10 and the bottom wall 48 of the hollow base 12, and is positioned above the bottom of the latter, for purposes explained more fully hereinafter.

Means is provided for insuring a positive vacuum tight seal between the contacting areas of the intermeshing screws and between the screws and housing wall. In the embodiment illustrated, an adjustable inlet valve 50 is mounted in the housing 10, preferably at the top thereof, to introduce a sealing liquid into the housing at a point adjacent the inner end of each screw. It is preferred that this point of injection be located outwardly from the central vacuum chamber 40 a distance of at least one turn of the helical screw. An inlet valve 50 is provided for each of the pair of screws 30 and 32, and these valves communicate through the conduit 52 with the sealing liquid well 54 formed by the hollow base 12. Similarly, inlet valves 50' are connected through conduit 52' to the well 54 for the screws 30' and 32'.

The driving shaft 28 is operated to rotate the screws in the directions indicated by the arrows in FIG. 1. Thus, air is drawn outwardly from the central vacuum chamber 40 and exhausted at the outer ends of the screws to the atmosphere passageway 42 and outlet 44. As the pressure thus is reduced below atmospheric in the vacuum chamber 40 and in the helically moving chambers 34, 36 atmospheric pressure above the sealing liquid 60 in the well 54 forces the liquid through the conduits 52, 52' and the injection valves 50, 50', from whence it is injected into the helically moving chambers. The sealing liquid thus becomes distributed over the surfaces of the screws and contoured screw housing, effectively sealing the spaces between them to form a vacuum tight seal. The sealing liquid is carried outwardly in the direction of travel of the helical screws, where it is returned to the well 54 for continuous recycling.

It is to be noted that the volume of sealing liquid injected into the helically moving chambers 34, 36 is not critical, as it is in conventional vacuum pumps, since no exhaust valving is required. This latter simplification also contributes materially to much quieter operation and fewer maintenance problems.

Various modifications and changes in the structural details described hereinbefore may be made, as will be apparent. For example, only one pair of intermeshing screws 30, 32 need be provided, in which case the pair of screws 30', 32' to the right of the central vacuum chamber 40 in FIG. 1 may be omitted. The pitch of the intermeshing screws may be varied, as desired, and so also may be the number of turns of the intermeshing screws. Additional shaft and screw assemblies, similar to the assembly on shaft 20, may be provided for intermeshing with the driven screw, to increase the capacity of the pump. The helical screws may be tapered or stepped to smaller diameter toward their outer ends, with corresponding increase in shaft diameters, in order to achieve greater compression. A positive displacement or constant pressure pump may be used to circulate the sealing liquid.

The foregoing and other modifications and changes may be made without departing from the spirit of this invention and the scope of the appended claim.

Having now described my invention and the manner in which it may be used, what I claim as new and desire to secure by Letters Patent is:

A vacuum pump comprising a pair of intermeshed helical rotor screws proportioned to engage each other on all intermeshing surfaces, a housing for the screws proportioned to engage all peripheral screw surfaces which are not intermeshing, the housing forming a vacuum chamber at one end of the screws trailing the direction of longitudinal travel of the helical screws, and an atmosphere passageway at the opposite end of the screws, substantially the entire area of the atmosphere ends of the screws being exposed to the atmosphere passageway, a base supporting the housing and having a bottom wall spaced below the housing and forming a sealing liquid chamber which communicates with the atmosphere passageway for returning sealing liquid by gravity from the atmosphere passageway to the sealing liquid chamber, the atmosphere passageway and sealing liquid chamber communicating with the atmosphere above the level of sealing liquid in the sealing liquid chamber, and a conduit external of the housing and communicating at one end with the sealing liquid chamber below the level of sealing liquid therein and at the opposite end with an opening through the top side of the housing adjacent the vacuum chamber, whereby the greater pressure of the atmosphere above the sealing liquid in the sealing liquid chamber forces the sealing liquid upward through the conduit and the top opening in the housing for coating the surfaces of the screws, the sealing liquid being moved by the screws to the atmosphere passageway for return by gravity to the sealing liquid chamber.

References Cited in the file of this patent

UNITED STATES PATENTS

| | | |
|---|---|---|
| 1,056,859 | Vernon | Mar. 25, 1913 |
| 1,409,868 | Kien | Mar. 14, 1922 |
| 1,424,312 | Leonard | Aug. 1, 1922 |
| 1,430,894 | Fay | Oct. 3, 1922 |
| 1,439,628 | Kien | Dec. 19, 1922 |
| 1,672,571 | Leonard | June 5, 1928 |
| 1,673,260 | Meston et al. | June 12, 1928 |
| 1,675,524 | Zajac | July 3, 1928 |
| 1,701,198 | Tifft | Feb. 5, 1929 |
| 1,799,539 | Smith | Apr. 7, 1931 |
| 1,836,249 | Holmes | Dec. 15, 1931 |
| 1,930,403 | Van Der Does Bije | Oct. 10, 1933 |
| 2,070,151 | Westin | Feb. 9, 1937 |
| 2,305,317 | Nickell | Dec. 15, 1942 |
| 2,460,310 | Rathman | Feb. 1, 1949 |
| 2,463,871 | Hapgood | Mar. 8, 1949 |
| 2,654,532 | Nichols | Oct. 6, 1953 |
| 2,802,343 | Seldon | Aug. 13, 1957 |

FOREIGN PATENTS

| | | |
|---|---|---|
| 220,581 | Australia | Feb. 25, 1959 |
| 616,609 | Great Britain | Jan. 25, 1949 |